E. HAIMAN.

PLOW.

No. 7,724. Reissued June 5, 1877.

Witnesses:

Geo. H. Graham.
O. S. Strauss

Inventor:

Elias Haiman
By James A. Hudson
Atty

N. PETERS, PHOTO-LITHOGRAPHER, WASHINGTON, D. C.

UNITED STATES PATENT OFFICE.

ELIAS HAIMAN, OF COLUMBUS, GEORGIA.

IMPROVEMENT IN PLOWS.

Specification forming part of Letters Patent No. 111,055, dated January 17, 1871; reissue No. 7,724, dated June 5, 1877; application filed December 22, 1876.

*To all whom it may concern:*

Be it known that I, ELIAS HAIMAN, of the city of Columbus, in the county of Muscogee and State of Georgia, have invented a new and useful Improvement in Plows; and I do hereby declare that the following is a full, clear, and exact description thereof, which will enable others skilled in the art to make and use the same, reference being had to the accompanying drawings, forming part of this specification, in which—

Figure 1:
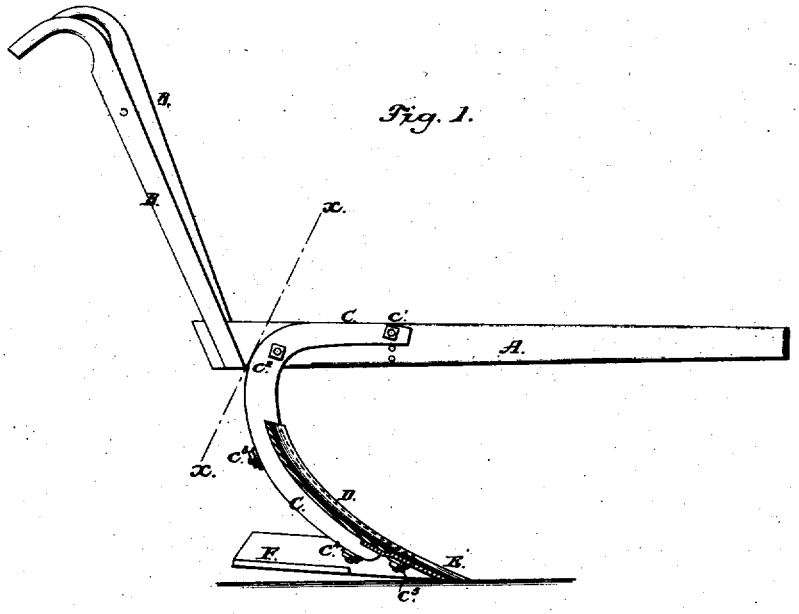
Figure 2:
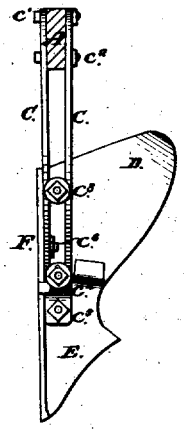

Figure 1 is a side view of my improved plow, part of the mold-board being cut away to show more fully the construction of a part. Fig. 2 is a rear view of part of the same, partly in section through the line *x x*, Fig. 1.

Similar letters of reference indicate corresponding parts in each of the figures.

The object of my invention is to produce a plow of simple construction, strong and durable, and convenient for use, and readily adapted to the exigencies of its use as an agricultural implement; and it consists in the form of construction of the standard and the combination therewith and arrangement thereon of the beam and operating parts, as shown in the figures and herein further described.

In the figures above mentioned, A represents the plow-beam, to the rear end of which the handles B are attached. C is the plow-standard. D, E, and F are the operating parts of the plow, D being the mold-board, E the plow-point, and F the land-side.

The standard C is made of two parallel bars of iron, welded or otherwise rigidly fastened together at their lower ends, but separate above, and bent into substantially the form shown in Fig. 1.

To the lower part of the standard C the mold-board D is secured by two bolts, $c^3$ and $c^4$, which pass through it and through the space between the bars that form the standard C. The plow-point E is made with a flange upon its upper edge to project beneath the lower edge of the mold-board D, and it is secured in place at the lower end of the standard C by the bolt $c^5$, and the land-side F is secured in its place on the standard C by the bolt $c^6$, as shown in Fig. 2.

Between the upper portions of the standard C, which are bent forward, as shown in Fig. 1, the beam A is held in place by the bolts $c^2$ and $c^1$, which pass through the standard and the beam. Several other holes are formed through the beam A, as shown in Fig. 1, for the reception of the bolt $c^1$, so that the forward end of the standard may be fixed at higher or lower positions on the beam, as desired, to change the pitch of the operating parts secured to the lower end of the standard, the bolt $c^2$, for the purpose of facilitating such change, acting as a pivotal point.

The form of the standard and manner of combining it with the beam herein shown and described afford all needed strength and stiffness in such parts, and consequently no auxiliary bracing between the operating parts and the beam or other upper parts of the plow is necessary as an aid to the standard, while the manner of attaching to and combining the operating parts with the lower part of the standard, shown and described, renders unnecessary any support or bracing for such parts other than that supplied by the standard itself, and hence great facility in adjusting the pitch of the plow, as well as of removing and changing the operating parts described for others, or when broken or worn out, is attained.

Having thus described my invention, I claim as new and desire to secure by Letters Patent—

1. In combination with the beam A, the double adjustable standard C, with the point E, mold-board D, and land-side F arranged thereon, all substantially as shown and described.

2. The combination of the curved double adjustable standard C and beam A, the standard being pivoted to the beam at $c^2$ and having its upper portions extended along the beam, all substantially as and for the purpose specified.

3. The arrangement of the plow-point E, mold-board D, land-side F, standard C, and bolts $c^3$, $c^4$, $c^5$, and $c^6$, as and for the purpose specified.

ELIAS HAIMAN.

Witnesses:
JOSEPH SPIRO,
J. W. CULPEPPER.